Jan. 26, 1965     J. A. HUFENUS ETAL     3,167,348
WINDSHIELD GUARD Filed Aug. 1, 1961     6 Sheets-Sheet 1

INVENTORS
JEAN A. HUFENUS
PAUL F. HUFENUS

BY OSTROLENK, FABER, GERB & SOFFEN

ATTORNEYS

Jan. 26, 1965  J. A. HUFENUS ETAL  3,167,348
WINDSHIELD GUARD

Filed Aug. 1, 1961  6 Sheets-Sheet 2

INVENTORS
JEAN A. HUFENUS
PAUL F. HUFENUS
BY
OSTROLENK, FABER, GERB & SOFFEN
ATTORNEYS

INVENTORS
JEAN A. HUFENUS
PAUL F. HUFENUS

Jan. 26, 1965    J. A. HUFENUS ETAL    3,167,348
WINDSHIELD GUARD

Filed Aug. 1, 1961    6 Sheets-Sheet 5

INVENTORS
JEAN A. HUFENUS
PAUL F. HUFENUS
BY
OSTROLENK, FABER, GERB & SOFFEN
ATTORNEYS

Jan. 26, 1965   J. A. HUFENUS ETAL   3,167,348
WINDSHIELD GUARD
Filed Aug. 1, 1961   6 Sheets-Sheet 6

INVENTORS
JEAN A. HUFENUS
PAUL F. HUFENUS
BY
OSTROLENK, FABER, GERB & SOFFEN
ATTORNEYS

United States Patent Office 3,167,348
Patented Jan. 26, 1965

3,167,348
WINDSHIELD GUARD
Jean A. Hufenus, 6 Rue Hershel, Paris, France, and Paul F. Hufenus, 90 Rue Montmorency, Sete, Herault, France
Filed Aug. 1, 1961, Ser. No. 129,209
Claims priority, application France, Aug. 3, 1960, 834,923, Patent 1,272,958
16 Claims. (Cl. 296—84)

The invention concerns a method and a device for improving visibility through the windows of vehicles; and in particular to an improved windshield guard.

The invention is applicable to various vehicles, such as automobiles, airplanes, ships, locomotives, etc. It provides for continuous visibility of a windshield or other window when subjected to possible obscuring as by rain, snow, dust, insects, fog, moisture, frost or other deposits.

Known means for providing clear vision for the operator of a vehicle are generally constituted by mobile wipers, which scrape against the outer surface of the windshield with an alternating movement. This movement is, however, generally bothersome to the operator and tends to scratch or otherwise damage the glass of the windshield. Also, such wipers are not too effective in preventing the accumulation of snow, ice or insects on the glass. Other known means, such as transparent rotative discs mounted in front of the windshield, have also been suggested. These arrangements are not satisfactory because of the variation of centrifugal force from the center to the periphery of the discs. Endless transparent bands have also been proposed to solve the problem. Their principal drawbacks are:

(1) Two layers; that is, a double thickness of the band, travel simultaneously before the eyes of the operator; and (2) The band is deformed by the action of the dynamic pressure of atmospheric air as the vehicle moves.

The general object of the present invention is to provide a windshield guard avoiding the above-mentioned drawbacks of the prior art.

One object of the invention is to provide a method permitting clarity of vision through a windshield or window by continuously moving a single transparent flexible band in front of the glass of the windshield or window, with the band being cleaned as it passes through a region physically removed from the area of vision.

Another very important object of the invention is to avoid deformation of the transparent band, resulting from the dynamic pressure of atmospheric air, by applying a counter-pressure to the band, as by means of a fluid force.

A still further object of the invention is the provision of a device for carrying out the above-mentioned method, including means for applying a counter-pressure to the band.

Again, an object of the invention is to provide means for rendering the above device retroactive, thereby permitting it at will to be brought onto or away from the windshield.

Other objects of the invention will become clear in view of the following description.

The new method, according to the invention, consists in moving an endless, transparent and flexible band, in continuous motion, in front of a window glass of a vehicle, in such a way that: the band is passed before at least a part of the glass substantially in parallel or homothetical with respect to the glass; it is obliquely folded over an axis and is passed into contact with cleaning means, located beyond the area of vision; it is again obliquely folded over another axis, again passed before at least a part of the glass, and so on to repeat its path.

A very important aspect of the invention consists in passing the band in tight relationship with respect to the window of the vehicle, and to introduce a fluid between the window and the band, so as to counterbalance the dynamic pressure of atmospheric air on the band resulting from the movement of the vehicle.

The device according to the invention comprises: a frame to be placed against the outer face of a windshield; an endless, transparent, flexible band supported by said frame; at least two rotatable axes, situated respectively at the opposite ends of the frame, and placed obliquely with respect to a straight line which determines the distance between the ends of the frame, the band passing over the axes in contact relation therewith; means for cleaning the band and means for imparting a continuous movement to the band, situated beyond the area of vision of the windshield.

The band according to the invention consists of an apron-like member which travels through the area of vision of the windshield and is preferably elastic, at least in one direction. The band may be constituted of a material such as for example polyethylene, plasticized vinyl chloride, polyamide, polyvinyl butyral, polyacryl esters, acrylonitrile-butadiene-styrene copolymers, polytetrafluoroethylene etc.

In the various embodiments shown for carrying out the invention, the band is shown of different shapes, as for example, circular, elliptical, annular or truncated.

According to one particular embodiment for carrying out the invention, the endless band is flat or annular and has in one part of it a 180° twist. Such an endless band can be formed from a straight band by joining the ends thereof so that one face of the band at one end is superposed on the same face of the other end. The twisted band has the advantage that when used according to the invention, both its faces will successively pass in front of the windshield. That is, after a first complete revolution of the band, the face which previously faced the windshield automatically becomes the external face. The faces then reverse during the next revolution, and so on.

In the accompanying drawings certain embodiments of the invention are illustrated by way of non-limitative examples.

Figure 1:
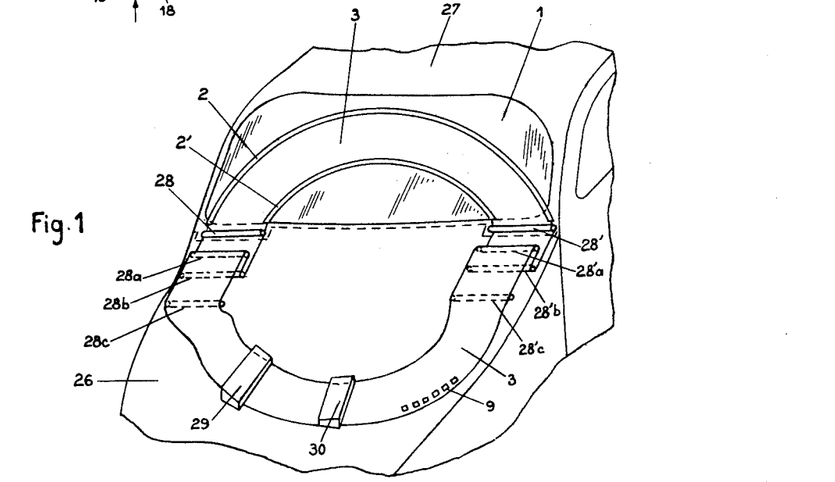
FIGURE 1 is a perspective view of a portion of the front of an automobile, with the device of the invention arranged on the windshield.

FIGURE 1 shows a device according to the invention, arranged on the windshield 1 of an automobile, the front portion of which 30 is shown by roof 27 and hood 26.

On the glass of windshield 1 is placed a frame which comprises two arcuate sections 2 and 2'. Between the lower ends of these sections are mounted respectively rollers 28 and 28' linked with a horizontal support which, for the sake of clarity of the drawing, is not represented, but is obvious to those skilled in the art. The support also holds rollers 28a, 28b, 28c, and 28'a, 28'b and 28'c. Roller 28a is situated above 28b, and 28'a above 28'b. These rollers guide the transparent flexible band 3.

A cleaning means 29 is fastened to the forward region of the horizontal support. Cleaning means 29 is a stationary wiper for cleaning the band 3. The wiper typically includes a water distributor connected to a feeding can (not shown) situated beneath the cowl of the vehicle. Beside the wiper 29 is a drier 30 which may comprise one or more rollers having jackets of felt or other absorbent material, and which preferably includes a hot air blower, of known construction.

The mobile band 3 is slidably inserted between the members 2 and 2' as will be better explained in connection with FIG. 2. The band 3 is provided at its edges with equally spaced perforations 9 adapted to mesh with the pins of a chain or wheel of a moving means (such as wheel 10 of FIG. 3). Perforations 9 are shown only along a portion of the band, with it being understood that, in fact, they are provided along the whole length of the band.

Figures 5, 6, 11, 12, 13, 14:
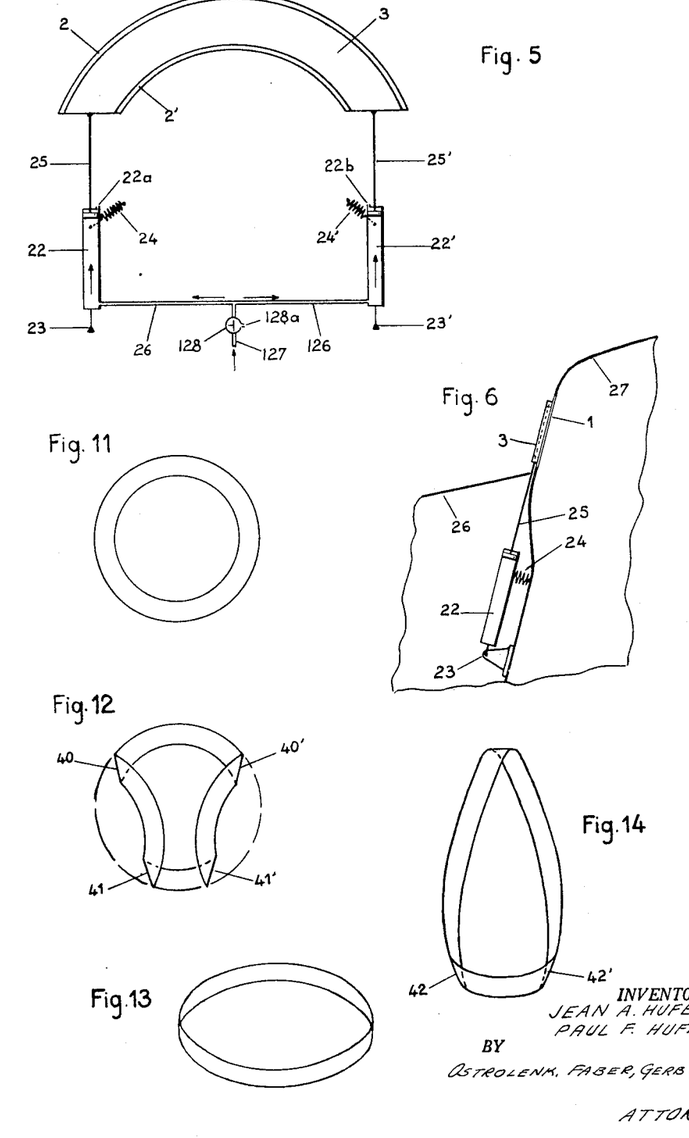
FIGURE 5 is a diagrammatic view of means for retracting the device of the invention.
FIGURE 6 is a side view corresponding to that of FIGURE 5.
FIGURES 11 to 14 show some forms of the endless transparent band used by the invention.

The band 3, used in the device of FIG. 1, is of a flat circular configuration, as shown on FIG. 11. It runs below rollers 28–28b and 28'–28'b disposed in a plane oblique with respect to that of the glass 1, and situated below the lower end of the windshield, within hood 26. During operation, the band runs over rollers 28a–28c and 28'a–28'c, and then it comes into contact with the cleaning means 29 and the drier 30, also placed within the hood 26 of the automobile.

Band 3 is moved in the direction of the arrow of FIG. 1, with a velocity which may be, for example, of the order of 5 to 50 cm./sec. Should rain be spattering the band, the driver of the vehicle, sitting behind the left half of the windshield 1, will have clear visibility through the glass. That is, the band which continuously travels before his eyes is clean, since it feeds to the windshield from roller 28' after having been cleaned at 29 and dried at 30. As the band becomes spattered with rain, it continuously progresses to the right (as seen by the driver), down to the roller 28, and then to 29 and 30. After being cleaned it again is presented to roller 28', the frame 2–2' on windshield 1 and so on.

Figures 2, 3, 8:
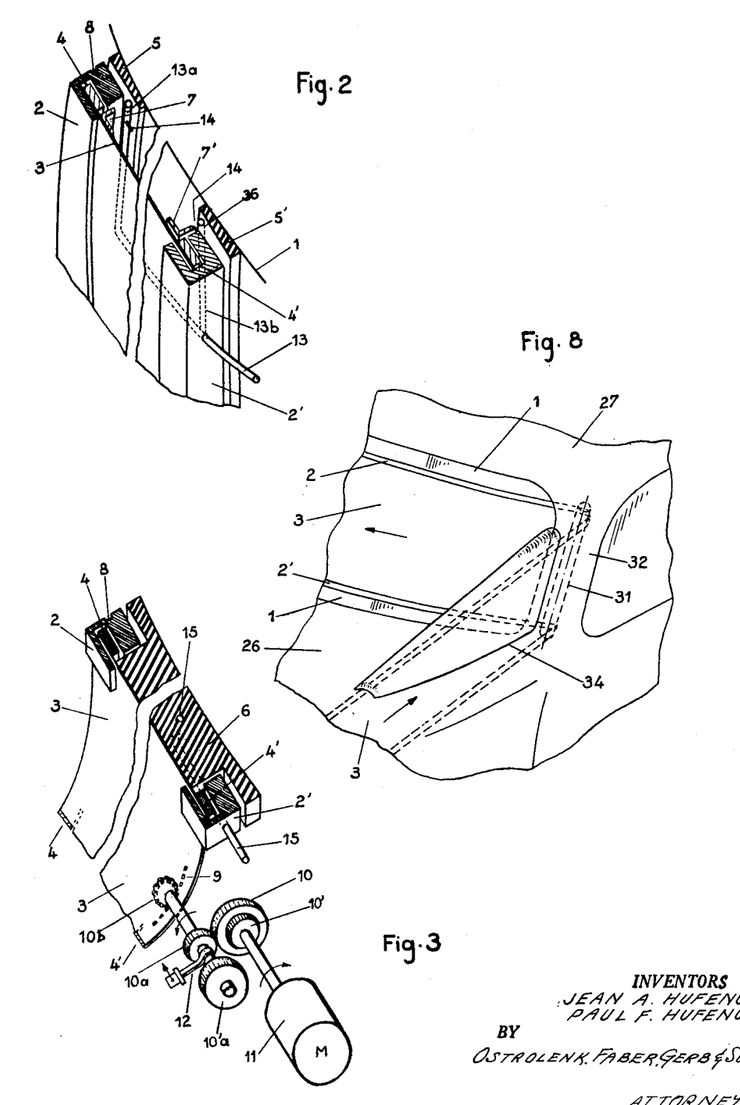
FIGURE 2 is a fragmentary perspective view in transversal section of a frame which supports and guides the transparent band in the device of the invention.
FIGURE 3 is a fragmentary perspective view in section showing the lower part of the frame of FIG. 2, as well as the means for moving the band.
FIGURE 8 is a perspective view of another variant of the invention.

FIGURE 2 gives a fragmentary view, in transversal section, of the frame within which the band 3 slides during its continuous movement. This figure shows a portion of the arcuate frame comprising the members 2 and 2' of FIG. 1. The main parts of the frame are the arcuate sections 2–2' constituting the outer casing thereof, within which are provided corner-members 7 and 7'. These members are preferably formed of rubber or plastic material, serving as inner backing for the band 3, and ensuring tightness between the band and the frame.

The edges of band 3 are strengthened with strips 4 and 4' which may be formed by the material of the band itself, thicker than the remainder of the band. The perforations 9, seen on FIGS. 1 and 3, are provided in the strips 4 and 4'. The strips are slidingly arranged within corresponding grooves in the sections 2–2', while they are kept therein by the backings 7–7'.

The sections 2 and 2' may be of metal or any other sufficiently rigid material. Elastic joints 5 and 5' are preferably inserted between the rear face of sections 2–2' and the surface of glass 1. These joints are advantageously formed of rubber or rubber-like material, having a shape conforming to that of the glass, so that they perfectly adhere to the latter.

In a particularly useful variant of the invention, a pipe 13 passes through the frame and penetrates into the inner space between glass 1 and band 3. The pipe is provided for introducing a pressurized fluid into said space, such as air for example, in order to equalize pressure on both sides of the band. According to the embodiment shown on FIG. 2, the fluid is distributed by means of two tubular branches 13a and 13b of the pipe 13, having adequately directed nozzles 14 through which the fluid passes into the space between 1 and 3.

FIGURE 3 illustrates the lower part of the frame comprising sections 2–2', as well as a fraction of band 3, together with the means for moving the band designated by numerals 10 to 12. The lower ends of sections 2 and 2' are seen on this figure, in conjunction with transverse member 6, preferably of rubber, which constitutes a bottom of the frame. This bottom is situated below the lower end of the windshield 1, and ensures tight sealing of the space between band 3 and glass 1. Means for fastening together the sections 2–2' and the bottom 6 are not shown, as they are conventional and well known of those skilled in the art.

Figure 4:
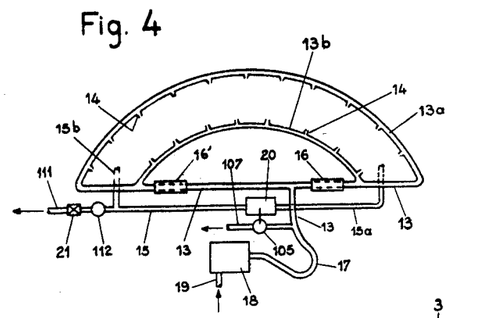
FIGURE 4 is a diagrammatic plan view showing means for equalizing pressure on both sides of the band.

FIGURE 4 shows the above fluid distribution arrangement, the view being represented in a plane parallel to that of the band 3.

A tube 15 is shown which passes through section 2' and communicates with the space between 1 and 3. This tube 15 constitutes the outlet of the fluid used for equalizing pressure on both sides of the band. When the equalizing is effected by establishing a static pressure of fluid within the space between 1 and 3, it is advantageous to provide the tube 15 with an automatic valve of known kind, which opens to the exterior atmosphere as the pressure within said space reaches a certain predetermined value, with the operation thereof being set forth in greater detail in conjunction with FIG. 4.

The means for imparting continuous movement to the band is shown as drive gears 10, 10' rigid on a common shaft coupled with a motor 11. The gear 10 is in engagement with the pinion 10a which is rigid on another shaft on the opposite end of which is secured a wheel 10b having pins adapted to mesh with the perforations 9 in the edges of band 3. The velocity of the motion of the band may be varied by engaging gear 10' with pinion 10'a by actuating the handle 12. Of course, a continuous variation of velocity can be obtained with various other known reduction gear systems in place of 10–10'—10a–10'a.

Alternatively, the motion of the band can be produced by other known means, for example with pairs of rotative rollers between which are clutched the edges of the band.

The motor 11, which turns the wheel 10b, may be a separate motor or a geared take-off from the driving-shaft of the vehicle.

Figure 10:
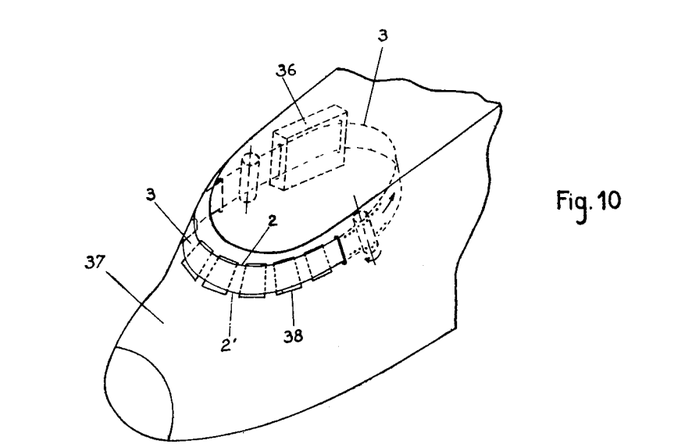
FIGURE 10 is a fragmentary perspective view of an airplane fuselage provided with a device of the invention.

The various parts illustrated on FIG. 3 are generally situated within the hood of the vehicle, but they may be fastened within a special casing. As, for example, when used in an airplane, as shown in FIG. 10, a special casing 36 may be provided.

In FIGURE 4 a set of pipes 13, 13a and 13b is seen shaped to conform to the plane of glass 1, as shown in FIG. 1. Advantageously, heating sleeves 16–16' surround a part of pipe 13, such that, the fluid blown through the pipe suppresses moisture from the band 3 and the glass 1 while serving to establish the required pressure within the space between the glass and the band.

In the lower region of FIG. 4, there are parts which are generally arranged beneath the cowl of the vehicle. No. 18 designates a compressor mounted on a conventional support (not shown). The output side of the compressor communicates with the pipe 13 through a flexible conduit 17. The length of the conduit 17 is sufficient to permit retraction of the pipes 13–13a–13b from the windshield 1 down into the hood 26, when it is desired to retract the device of the invention. This will be subsequently explained in greater detail in conjunction with FIGURES 5, 6 and 16–19.

Through inlet 19 atmospheric air or the exhaust gas of the vehicle motor arrive into the compressor 18. The compressed fluid flows through conduit 17 into pipe 13, while a portion of it is permitted to flow to the atmosphere by a branch 107 which communicates with 17 through a valve 105.

Figure 15:
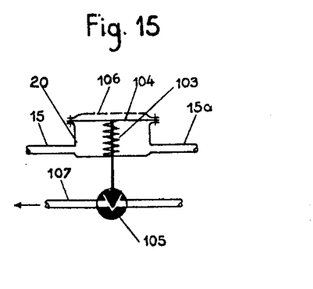
FIGURE 15 is a diagrammatic representation of a differential pressure controller which may be used with the device of FIG. 4.

The valve 105 is automatically actuated by a differential pressure controller 20, the principle of which is shown on FIG. 15. The controller 20 comprises a casing the interior of which is connected with the tubes 15 and 15a. The other ends of tubes 15, 15a extend into the space between band 3 and windshield 1. The casing is shut with a membrane 104 externally protected by a screen 106. Between the membrane 104 and the bottom of the casing there is inserted a compression spring 103, at the upper end of which is secured a rod passing in tight engagement through the bottom of the casing. The lower end of the rod constitutes the actuator of the valve 105.

In the device according to the invention the differential pressure controller is so placed within the vehicle that the surface of membrane 104 faces the impact of the wind of atmospheric air as the vehicle is in forward movement. That is, the surface of membrane 104 is approximately parallel to the windshield. As the velocity of the vehicle increases, the dynamic pressure of air upon the membrane 104 increases, and the spring is compressed. Thus, the actuator end of the rod enters deeper into its seat-box within the valve 105. Thus, communication between 17 and 107 is reduced or even completely cut off, and as a result more or all of the fluid supplied by the compressor 18 flows into pipe 13 and increases the pressure within the space between band 3 and the windshield 1. This pressure counterbalances the impact of wind upon band 3.

Conversely, when the velocity of the vehicle decreases, the spring 103 moves the rod upward, resulting in a larger opening of the valve 105. Hence, a greater portion of the fluid blown by the compressor 18 will now escape through 107 to the atmosphere and less fluid flows into pipes 13–13a–13b. Thus, the counterpressure between 1 and 3 is reduced corresponding to the lower pressure exerted by the decreased wind forces.

The set of pipes 15–15a–15b, shown on FIG. 4, constitutes a return to the atmosphere of the fluid introduced by 13. Numeral 111 designates the outlet to the free atmosphere. At 112 is a safety-valve adapted to open when a predetermined pressure is reached within pipes 15–15a–15b. There is also a hand controlled valve 21 for adjusting the pressure difference between the inner pipes 15, 15a–15b and the atmosphere.

The compressor 18 may have its own motor or be appropriately coupled to the shaft of the vehicle.

The controller 20 (or any equivalent regulator) may directly act upon the driving shaft of the compressor instead of valve 105. If so the branching 107 may be omitted.

In a general manner, the counter-pressure within the space between band 3 and windshield 1 may vary—according to the velocity of the vehicle—between about 1 to 100 p.s.i. That involves, for an average size automobile, a flow of fluid, through the outlet 111, of about a few millilitres to a few litres per second. When heating of the band 3 is not required, the flow of fluid may be considerably reduced, so that practically a static pressure is kept between the band 3 and the windshield 1.

FIG. 5 is a diagrammatic front view of a system for rendering retractable the device of the invention, while FIG. 6 is a side view of this system. One end of each of rods 25 and 25' is secured to one side of the lower part of the frame formed by the sections 2–2'. The lower end of each rod 25–25' contains a piston which slides within a corresponding cylinder 22 and 22'.

The cylinders 22–22' are joined at their lower ends, to axes 23–23' rigid with the body of the vehicle. The upper parts of the cylinders are resiliently connected to the body of the vehicle, by intermediate springs 24–24'. Normally the springs provide forces in such a direction as to keep the frame 2–2' adequately pressed against the windshield 1.

The cylinders 22 and 22' have outlet orifices 22a and 22b at their upper end, while their bottom region is in communication with a common conduit 126. The cylinders act as hydraulic or pneumatic jacks. The fluid is provided by a compressor or a reservoir of compressed air (not shown); and enters through pipe 127 connected to conduit 126 by a three-way cock 128 which has an overflow orifice 128a.

On FIGS. 5 and 6 the frame which supports the band 3 is in the working (non-retractable) position upon the windshield 1. This position is maintained by the compressed air by which comes from 127, and acts upon the lower face of the pistons, rigid with the lower ends of rods 25 and 25'. In this condition the valve or three-way cock 128 is open, so that the compressor source is in communication with the inner of cylinders 22–22' through 126 and 27.

When it is desired to retract the frame, it is merely necessary to turn the cock 128 by 90°, so that the interior of cylinders 22–23' communicates with atmospheric-air through the overflow orifice 128a, while the passage from 127 to 126 is shut. Then the air entrapped within the cylinders escapes through 128a and the pistons of rods 25–25' slide down to the bottom of cylinders 22–22', bringing the frame down from the windshield.

By again actuating the cock 128 for re-establishing communication between 126 and 127, the frame is again put in its working position on the windshield 1.

In general, the length of retraction of the frame is approximately equal to the height of the frame.

Figures 16, 17:
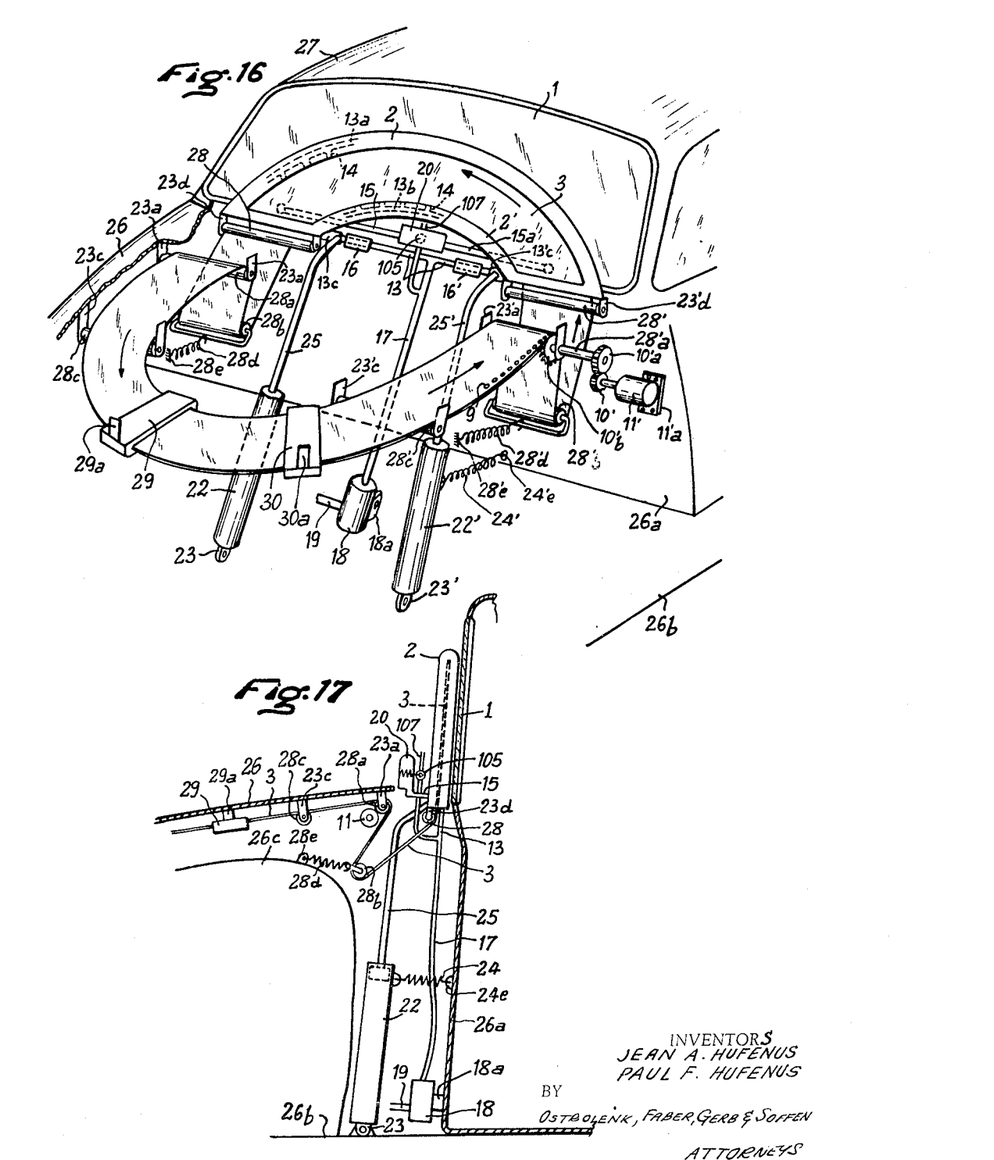
FIG. 16 shows an assembly according to FIGS. 1, 3 and 5 of the application, but is more detailed, as to the retraction mechanism generally shown in FIGS. 5 and 6. It shows the windshield guard in its operating position.
FIG. 17 is a section view of the system of FIG. 16, cut by a vertical axial plane passing longitudinally through the vehicle.
Figure 18:
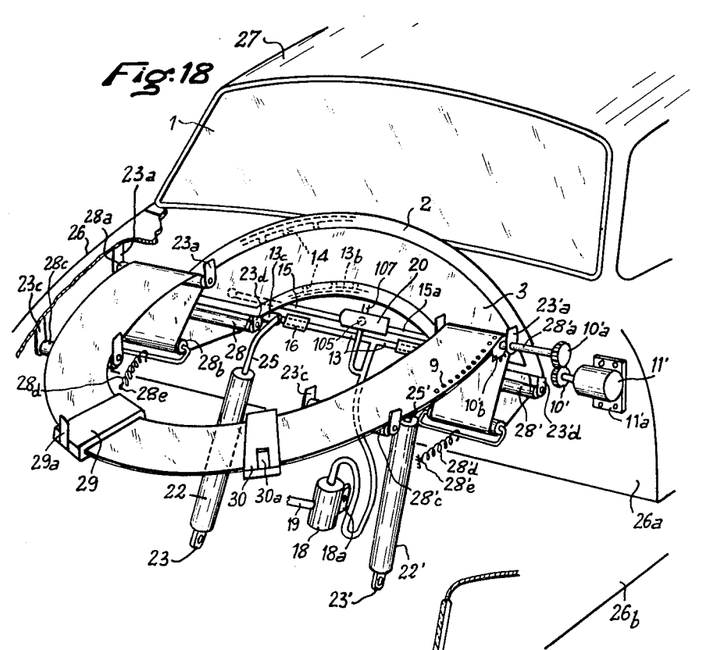
FIG. 18 shows exactly the same system as FIG. 16 does, but with the windshield guard retracted.
Figure 19:
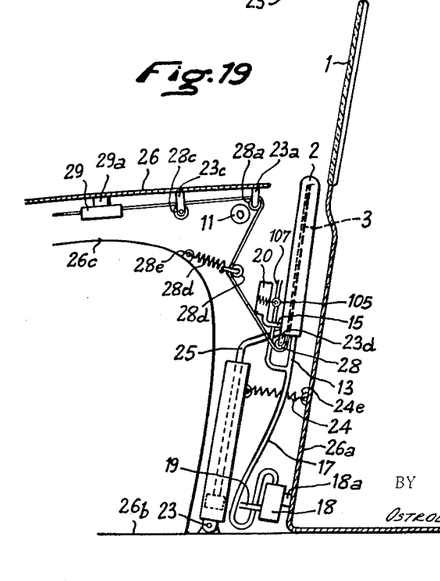
FIG. 19 is a sectional view corresponding to the retracted position of FIG. 18.

It will be seen, when comparing FIG. 16 with FIG. 18, and 17 with 19, that the retraction of the windshield guard involves the lowering of rollers 28 and 28' respectively supported by flanges 23d and 23'd and rigid with the frame 2 and with the retraction means 25–22 and 25'–22'. All the remaining parts of the structure, that is rollers 28a–28'a, 28b–28'b, motors 11–11' with gears 10–10', 10a–10'a, cleaner 29 and drier 20, are not moved from their fixed position.

As the cylinders 22–22' and rods 25–25' are operated by the hydraulic means of FIGS. 5 and 6, rods 25 and 25' go down respectively into the cylinders 22 and 22', while their upper ends draw down the part of the structure which comprises rollers 28–28', frame 2, sleeves 16–16', pipe 13 and valve 105.

In the retractable position, the retractable parts (2, 18, 28, 25, 25') are maintained in desired position by the cylinders 22 and 22' which are secured to the vehicle at 23–23'.

It is understood that other known means may be used for rendering retractable the device of the invention; for example, a mechanical arrangement of pinions and racks can be substituted for the above described particularly advantageous pneumatic system.

Figure 7:
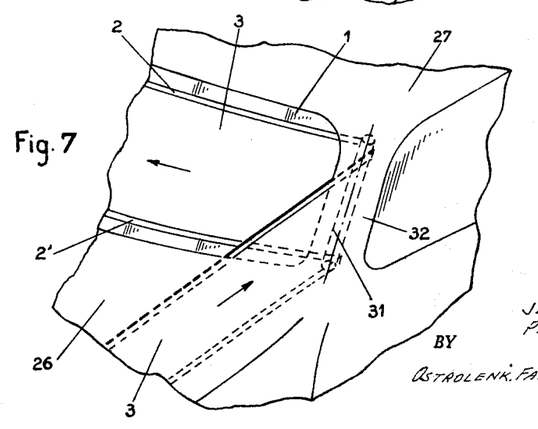
FIGURE 7 is a perspective view of a portion of the front of an automobile and of a variant of the device according to the invention.

According to a variant of the invention, illustrated in FIG. 7, a rotative axis or roller 31 is mounted within each of the two side posts or side frame members 32 of the vehicle, which laterally border the windshield 1. The flexible band 3 runs over these rollers 31 and is obliquely directed towards the parts 28, 29, 30, etc. within the hood 26 as shown in FIG. 1.

FIG. 8 shows an arrangement similar to that of FIG. 7, but which comprises a guide shielding 34 ahead of each of the side posts 32. The guide 34 passes through the cowl of the vehicle down into the hood 26. In this variant the moving band 3 is protected by 34 along its path between the roller 31 and the interior of the hood 26.

Figure 9:
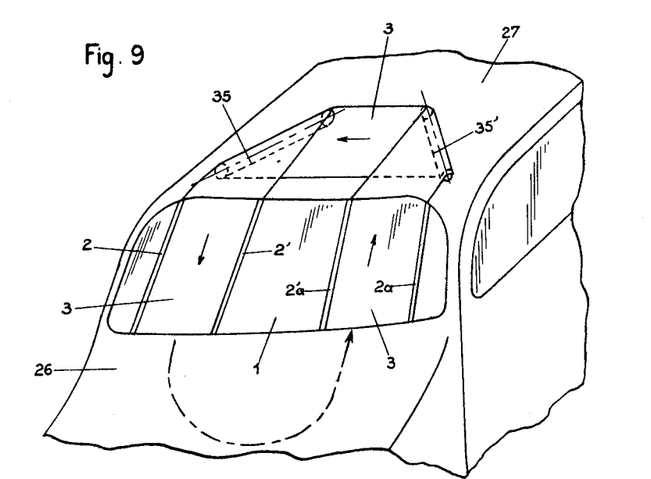
FIGURE 9 is a perspective view of a variant in which the band moves vertically.

In the variant according to FIG. 9 the band 3 travels in front of the glass 1 in substantially a vertical direction. It is shown passing along two paths, one before each of the two persons sitting on the two forward seats of the vehicle. There are two parallel frames at 2-2' and 2a-2'a extending along the height of the windshield 1. Within the roof 27 there is provided a ceiling within which are mounted at least two rotatable rollers 35 and 35' by conventional means (not shown in the drawing). On each of the rollers 35-35' the band 3 is subjected to oblique folding with respect to the direction line of its arrival onto the roll. Cleaning and drying means, such as 29 and 30 of FIG. 1, and eventually other mechanical parts, may also be provided within the ceiling.

The parts of the device of FIG. 9, situated in the interior of hood 26, may be similar to those of FIG. 1. Alternatively, the arrangement of rollers within 26 can be the same as within the ceiling in roof 27, with adequate cleaning or cleaning and drying means, as well as moving means being provided therein.

FIGURE 10 illustrates an application of the invention to airplanes. It shows diagrammatically a portion of fuselage 37 with port-holes or windows 38. The frame 2-2' surrounds the fuselage and terminates in a casing 36 situated in the interior of the fuselage. Within the casing 36 are contained the cleaning, drying and moving means, as well as the means for equalizing pressure on both faces of the band 3, which are described above relatively to FIGS. 1 and 4. In the application to airplanes, because of the very high velocities involved, the creation of an adequate counter-pressure within the space comprised between the band 3 and the windows 38 is particularly useful. Here the heating means 16 (see FIG. 4) play a particularly important role in deicing the band 3. Of course, the sleeves 16 may be replaced by any other known means for providing hot air, or other hot fluid, to be blown into the space between band 3 and windows 38.

FIG. 11 represents a circular flat band, which constitutes the simplest form of band usable with the device of the invention. The same band is shown on FIG. 12 when folded over four axes or rollers 40, 40', 41 and 41' as it is in working position. It can be seen that each of the axes is oblique with respect to the line along which the band abuts to it.

A band in the form of a belt, as represented on FIG. 13, is also usable for the purposes of the invention, with the annular band of FIG. 13 preferably being of a truncated shape.

Another very useful form is that of FIG. 14 in which one of the faces of the band is twisted 180° with respect to the other, about lines 42 and 42'. When this band travels between the sections 2-2' of the device according to the invention, one of its faces meets the external wind during a first turn of the travel, and the second of the faces meets the wind in the second turn, and so on. Hence, both faces of the band work successively against the wind, and facing the windshield.

While means for exerting counter-pressure on band 3, as exemplified on FIG. 4, suit particularly the device described, it is understood that the invention also embraces the application of such means to known devices of prior art.

What we claim is:

1. A device for improving visibility through a window of a vehicle, comprising in a combination: a frame adapted to be laid on the outer face of the window; one single run of an endless, transparent, flexible band supported and slidingly guided by said frame with a single thickness of said band adjacent the window; at least two rotative axes respectively situated at the opposite ends of the frame, each axis being adapted to bear the band and being positioned obliquely with respect to the path of the band abutting thereon; means for cleaning the band and means for imparting to the band a continuous movement, said cleaning means situated beyond the area of the frame.

2. A device according to claim 1, wherein said endless band is of a flat circular configuration.

3. A device according to claim 1, wherein said endless band is of an annular configuration.

4. A device according to claim 1, wherein said endless band is a belt having one of its faces twisted by an angle of 180° with respect to its other face.

5. A device according to claim 1, which comprises means for retracting said frame together with the part of the band supported by the frame to a position vertically downward, away from the window, and for bringing said frame and said part of the band, at will, back to their initial position.

6. A device according to claim 1, wherein said endless band is of an annular truncated configuration.

7. A device according to claim 1, wherein said endless band includes a first and a second surface; at least one 180° twist provided within said endless band; the continuous movement of said band successively presenting said first and second surfaces adjacent said window.

8. A device for improving visibility through a window of a vehicle, which comprises in combination: a frame, adjacent the window, said frame formed of two parallel arcuate sections having a longitudinal groove extending parallel to the plane in which lay the sections, the open side of the groove of each section directed towards the other section, a longitudinal backing extending along each of the sections behind said groove; two transverse bottom members limiting respectively the pairs of ends of the sections; one single run of an endless, transparent and flexible band each edge of which is slidably engaged with the groove of one of said sections; at least two rotative rolls mounted each in one of the end regions of the frame and adapted to bear the band, the rolls being positioned obliquely with respect to the path of the band at the end of the frame; means for cleaning the band, situated below said transverse bottom members and means for imparting to the band a continuous movement; said frame defining an inner area; an air compressor situated below said transverse bottom members, the outlet of which compressor is connected with said inner area of the frame by means of at least one pipe the end of which is situated close to a surface of said band which faces said longitudinal backing.

9. A device according to claim 8, wherein said compressor has a regulator which automatically proportions its output to the external dynamic pressure of atmospheric air.

10. A device according to claim 8, wherein said frame comprises a flexible joint extending over the whole rear face of said sections, and capable of tightly adhering to a window, the space limited by said joint being connected with the atmospheric air by means of a tube.

11. A device according to claim 10, in which said tube is shut with a valve which opens when the pressure within the space limited by said joint reaches a predetermined value.

12. A device according to claim 8, wherein at least a part of said pipe is flexible, and means are provided for retracting said frame down to a position situated at a distance vertically downward from said window approximately equal to the height of the frame.

13. A device for improving visibility through a window of a vehicle, comprising a frame formed of at least two parallel sections, the ends of which are united by transverse members, in combination with: one single run of an endless, transparent, flexible band supported and slidingly guided by said frame, with a single thickness of said band adjacent the window; at least two rotative axes respectively situated at the opposite ends of the frame, each axis being adapted to bear the band and being positioned obliquely with respect to the path of the band at the end of the frame; means for cleaning the band and means for imparting to the band a continuous movement, said cleaning means situated beyond the area limited by the parallel sections of the frame.

14. A device for improving visibility through a window of a vehicle, which comprises in combination: a frame formed of two parallel arcuate sections having a longitudinal groove extending parallel to the plane in which lay the sections, the open side of the groove of each section directed towards the other section, a longitudinal backing extending along each of the sections behind said groove; two transverse bottom members limiting respectively the pairs of ends of the sections; one single run of an endless, transparent and flexible band each edge of which is slidably engaged with the groove of one of said sections, with a single thickness of said band adjacent the window; at least two rotative rolls mounted each in one of the end regions of the frame and adapted to bear the band, the rolls being positioned obliquely with respect to the path of the band at the end of the frame; means for cleaning the band, situated below said transverse bottom members, and means for imparting to the band a continuous movement.

15. A device for improving visibility through a window of a vehicle, comprising in combination: a frame adapted to be laid on the outer face of the window; one single run of an endless, transparent, flexible band supported and slidingly guided by said frame; at least two rotative axes respectively situated at the opposite ends of the frame, each axis being adapted to bear the band and being positioned obliquely with respect to the path of the band at the end of the frame; means for cleaning the band and means for imparting to the band a continuous movement, said cleaning means situated beyond the area of the frame; and means for exerting a pressure, by means of a fluid, upon the rear face of the band.

16. A device for improving visibility through a window of a vehicle, comprising a frame formed of at least two parallel sections, the ends of which are united by transverse members, in combination with: one single run of an endless, transparent, flexible band supported and slidingly guided by said frame; at least two rotative axes respectively situated at the opposite ends of the frame, each axis being adapted to bear the band and being positioned obliquely with respect to the path of the band at the end of the frame; means for cleaning the band and means for imparting to the band a continuous movement, said cleaning means situated beyond the area limited by the parallel sections of the frame, and means for blowing a fluid onto the rear face of the band.

References Cited in the file of this patent

UNITED STATES PATENTS

| | | |
|---|---|---|
| 2,062,747 | Gelstharp | Dec. 1, 1936 |
| 2,594,867 | Carmona | Apr. 29, 1952 |

FOREIGN PATENTS

| | | |
|---|---|---|
| 1,029,995 | France | Mar. 11, 1953 |
| 1,258,079 | France | Feb. 27, 1961 |